No. 775,433. PATENTED NOV. 22, 1904.
J. F. WERLE.
FASTENING DEVICE.
APPLICATION FILED DEC. 2, 1903.
NO MODEL.
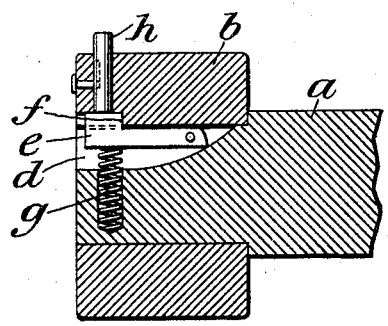
Attest:
H. N. Jesbera
Lucius E. Varney.
Inventor:
John F. Werle
by Redding, Kiddle & Greeley.
Attys.

No. 775,433.

Patented November 22, 1904.

UNITED STATES PATENT OFFICE.

JOHN F. WERLE, OF NEW YORK, N. Y., ASSIGNOR TO JAMES W. IRWIN, OF NEW YORK, N. Y.

FASTENING DEVICE.

SPECIFICATION forming part of Letters Patent No. 775,433, dated November 22, 1904.

Application filed December 2, 1903. Serial No. 183,456. (No model.)

*To all whom it may concern:*

Be it known that I, JOHN F. WERLE, a citizen of the United States, residing in the borough of Brooklyn, in the city of New York, in the State of New York, have invented certain new and useful Improvements in Fastening Devices, of which the following is a specification, reference being had to the accompanying drawings, forming a part hereof.

This invention relates to devices for fastening collars, nuts, &c., upon shafts, bolts, and the like, the object being to provide a simple fastening device of this character which shall be adapted to be operated easily and conveniently and which will securely fasten the parts to which it is applied.

The invention will be more fully described with reference to the accompanying drawing, in which the figure is a view in central longitudinal section of a shaft with a collar fastened thereto in accordance with the invention.

The invention is not shown herein as applied to any specific device, the shaft $a$ and likewise the collar $b$ being taken as conventional illustrations or types of such parts of a machine or apparatus to which the invention may be applied. The shaft $a$ in the present case is provided with a shank or reduced portion, upon which the collar $b$ fits. The shaft $a$ has a longitudinal recess $d$, in which a catch $e$ is pivoted, said catch being provided with a shoulder $f$, which engages the end, or, as shown in the drawing, a recessed portion of the collar $b$, a spring $g$ being provided to press against the catch and cause it to be held tightly against the collar in the fastening position. Any suitable means may be provided to press down the catch against the spring to release the collar. In the present case a pin $h$, resting against the catch, is loosely held in the collar and projects slightly from the periphery thereof, whereby the catch may be readily disengaged from the collar. Furthermore, the catch shown also serves as a spline, and, if desired, the recess in the collar may be extended longitudinally for this purpose, the catch in such case being formed so as to engage the recess throughout its whole length.

The fastening and unfastening of the collar upon the shaft will be readily understood from the foregoing description. No rotation of the collar will be permitted on account of the spline $c$, and no longitudinal movement of the collar can take place on account of the catch $e$. Where the catch acts also as a spline it alone prevents both longitudinal and rotary motion of the collar upon the shaft. It will also be understood that such device is not limited to fastening collars upon shafts, but may be applied as a nut-lock and in a great many other devices of like general character.

If desired, of course more than one catch may be used to give greater strength and stability.

I claim as my invention—

1. The combination of a shaft having a recess in its periphery, a collar upon the shaft also having a recess, and a catch pivoted in the recess in the shaft and adapted to engage in the recess in the collar to prevent the collar from rotating upon the shaft, said catch having a shoulder to engage the collar to prevent longitudinal movement of the collar upon the shaft.

2. The combination of a shaft having a recess in its periphery, a collar upon the shaft also having a recess, a catch pivoted in the recess in the shaft and adapted to engage in the recess in the collar to prevent the collar from rotating on the shaft, said catch having a shoulder to engage the collar to prevent longitudinal movement of the collar upon the shaft, and a spring to actuate the catch.

This specification signed and witnessed this 30th day of November, A. D. 1903.

JOHN F. WERLE.

In presence of—
JOHN M. SCOBLE,
M. TAYLOR.